(12) United States Patent
Rathschlag et al.

(10) Patent No.: US 8,980,977 B2
(45) Date of Patent: *Mar. 17, 2015

(54) PIGMENTS GRANULES

(75) Inventors: Thomas Rathschlag, Riedstadt (DE); Carsten Griessmann, Gross-Zimmern (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/823,139

(22) PCT Filed: Aug. 26, 2011

(86) PCT No.: PCT/EP2011/004294
§ 371 (c)(1),
(2), (4) Date: Mar. 14, 2013

(87) PCT Pub. No.: WO2012/034640
PCT Pub. Date: Mar. 22, 2012

(65) Prior Publication Data
US 2013/0172473 A1 Jul. 4, 2013

(30) Foreign Application Priority Data
Sep. 15, 2010 (EP) .................................... 10009618

(51) Int. Cl.
C08K 9/00 (2006.01)
C09D 5/29 (2006.01)
C08K 9/04 (2006.01)
C09C 1/00 (2006.01)
C09C 3/04 (2006.01)

(52) U.S. Cl.
CPC ................. C08K 9/04 (2013.01); C09C 1/0024 (2013.01); C09C 1/0051 (2013.01); C09C 1/0081 (2013.01); C09C 3/045 (2013.01)
USPC ........... 523/200; 523/171; 524/414; 524/431; 524/449; 524/584; 524/585; 252/500; 252/502; 252/518.1; 252/520.1

(58) Field of Classification Search
CPC ........ C08K 3/0033; C08K 3/10; C08L 33/08; C08L 33/06; C08L 51/10
USPC .................. 106/400, 417–418; 523/171, 200; 524/414, 431, 449, 584, 585; 252/500, 252/502, 518.1, 520.1
See application file for complete search history.

(56) References Cited

U.S. PATENT DOCUMENTS

| | | | |
|---|---|---|---|
| 3,087,828 A * | 4/1963 | Linton | 106/417 |
| 4,482,389 A | 11/1984 | Franz et al. | |
| 4,490,179 A | 12/1984 | Bernhard et al. | |
| 4,494,993 A | 1/1985 | Bernhard et al. | |
| 4,544,415 A | 10/1985 | Franz et al. | |
| 5,455,288 A * | 10/1995 | Needham | 523/205 |
| 5,571,851 A | 11/1996 | Freeman et al. | |
| 5,688,449 A * | 11/1997 | Fox | 264/54 |
| 5,759,255 A | 6/1998 | Venturini et al. | |
| 5,873,934 A | 2/1999 | Kunii et al. | |
| 6,120,899 A * | 9/2000 | Cameron et al. | 428/407 |
| 6,245,323 B1 | 6/2001 | Christie et al. | |
| 6,417,250 B2 | 7/2002 | Kieser et al. | |
| 6,761,762 B1 | 7/2004 | Greiwe et al. | |
| 6,866,710 B2 * | 3/2005 | Heider et al. | 106/403 |
| 7,172,812 B2 | 2/2007 | Greiwe et al. | |
| 7,390,842 B2 | 6/2008 | Kieser et al. | |
| 2001/0056135 A1 | 12/2001 | Kieser et al. | |
| 2004/0226480 A1 | 11/2004 | Greiwe et al. | |
| 2005/0143493 A1 | 6/2005 | Kieser et al. | |
| 2006/0223932 A1 * | 10/2006 | Kieser et al. | 524/449 |
| 2011/0251303 A1 * | 10/2011 | Rathschlag et al. | 523/171 |
| 2011/0301273 A1 * | 12/2011 | Rathschlag et al. | 524/431 |
| 2013/0264523 A1 * | 10/2013 | Rathschlag et al. | 252/502 |

FOREIGN PATENT DOCUMENTS

| | | |
|---|---|---|
| CA | 957 108 | 11/1974 |
| DE | 22 15 191 | 10/1972 |
| DE | 31 51 354 | 7/1983 |
| DE | 32 35 017 | 3/1984 |
| DE | 33 34 598 | 4/1985 |
| DE | 10 2008 064201 | 6/2010 |
| DE | 10 2008 064202 | 6/2010 |
| EP | 0 090 259 | 10/1983 |
| EP | 0 634 459 | 1/1995 |
| EP | 1 520 876 | 4/2005 |
| WO | WO-96 32446 | 10/1996 |
| WO | WO-99 57204 | 11/1999 |
| WO | WO-01 92425 | 12/2001 |

OTHER PUBLICATIONS

International Search Report for PCT/EP2011/004294, Date of the actual completion of the international search: Nov. 30, 2011, Date of mailing of the international search report: Dec. 13, 2011.

Harding, P. H. et al., "The role of adhesion in the mechanical properties of filled polymer composites," J. Adhesion Sci. Technol., 1997, vol. 11, No. 4, pp. 471-493.

Ponjeé, J. J. et al., "Chemical modification of surfaces," Philips Tech. Rev., Jul. 1988, vol. 44, No. 3, pp. 81-88.

* cited by examiner

*Primary Examiner* — Hannah Pak

(74) *Attorney, Agent, or Firm* — Millen, White, Zelano & Branigan, P.C.

(57) ABSTRACT

The present invention relates to pigment granules which are distinguished by the fact that they are based on a support material, where the support material is coated with one or more flake-form effect pigments by means of an adhesion promoter. The pigment granules according to the invention are preferably used for the pigmentation of application media, in particular paints, plasters, lacquers, powder coatings and plastics, and in particular as scatter and effect granules, for example for the decoration of wallcoverings.

15 Claims, No Drawings

PIGMENTS GRANULES

The present invention relates to pigment granules based on a support material coated with one or more flake-form effect pigments, and to the use thereof for the pigmentation of application media, in particular paints, plasters, lacquers, powder coatings and plastics, and as scatter granules, for example for the decoration of wallcoverings.

In the case of unfavorable configurations of workpieces with angular or round geometries, plane-parallel alignment of flake-form effect pigments is not always possible to an adequate extent. Different application media, such as, for example, powder coatings, water-borne pearl-effect coatings or wall emulsion paints, can also produce layer thicknesses of 100 μm to >1 mm. The relatively high layer thickness means that a plane-parallel alignment of the effect pigments is not always achieved, with the result that the effect pigments may "drown", which means that they are covered by binder (leafing).

A homogeneous plane-parallel alignment of the particles parallel to the wall surface is likewise destroyed by the stroking during application of wall paints by brush or roller. The pearl effect may consequently only align incompletely. In addition, a plane-parallel alignment of the pigments is not always desired, for example if the optical impression of a coating is not intended to change at various viewing angles.

Additives for improving the alignment of flake-form effect pigments, such as, for example, "Aquathix 8421" from "Byk-Chemie", likewise do not always result in applicationally reliable effect formation. The reason may be the predominantly physical mixture of the individual paint and coating constituents, which give applicationally stable results with maximum effect formation if the paint/coating systems are moved. To this end, the effect pigments must be kept in suspension by stirring or pumping. A relatively high density of the effect pigments can result in sedimentation in the binder systems employed.

Pigment granules comprising support materials and pigments are also employed in paints and coatings. Pigment granules of this type are known from U.S. Pat. No. 5,455,288 and WO 2010/072376. However, there continues to be a demand for pigment granules having improved and/or novel properties.

Surprisingly, it has now been found that specific pigment granules based on a support material, such as, for example, polymer particles, solid glass beads or hollow glass beads, or mixtures thereof, which are coated with one or more flake-form effect pigments are very highly suitable for economical and durable permanent coating with advantageous effects.

The present invention therefore relates to pigment granules which are based on at least one support material which is coated with at least one flake-form effect pigment by means of at least one adhesion promoter, where the support material has a particle size D50 of 3-1000 μm, and the proportion of flake-form effect pigment in the pigment granule is 40-90% by weight.

Coated here is taken to mean the surface coating of the at least one support material with the at least one effect pigment. The effect pigment is fixed to the surface of the support material by physical forces and/or the adhesion promoter. A proportion of effect pigment here may also be loose and not in surface-fixed form.

The pigment granules according to the invention are particularly suitable for use as scatter granules in the case of effect wallcoverings, for textured plaster systems, emulsion paints and textile coatings.

A particular advantage of the present invention is that the pigment granules according to the invention exhibit a strong glitter behavior. They do not exhibit an "on/off effect" from different viewing angles, but instead angle-independent glittering is generated by de-alignment of the flake-form effect pigments. The term "on/off effect" is used in the case of pigment particles if the reflection capacity of these particles changes when the viewing angle is changed.

The pigment granules according to the invention are non-dusting and very readily flowable, which reduces the equipment complexity for their processing. In addition, they are distinguished by the fact that they are abrasion-stable, dimensionally stable and have a uniform color effect. They have negligible separation in the formulation and after application. Leafing thus only occurs to a negligible extent. They can also readily be processed with uniform dispersion.

As essential components, pigment granules comprise at least one flake-form effect pigment, which is selected from the group of the pearlescent pigments, interference pigments, metal-effect pigments, multilayered pigments having transparent, semi-transparent and/or opaque layers, goniochromatic pigments, holographic pigments, coated or uncoated BiOCl flakes and/or LCP pigments.

Pearlescent pigments, interference pigments, metal-effect pigments or multilayered pigments having transparent, semi-transparent and/or opaque layers which can be employed are based, in particular, on substrates, where the latter are preferably in flake form. Suitable are, for example, flake-form $TiO_2$, kaolin, talc, synthetic (for example fluorophlogopite) or natural mica, doped or undoped glass flakes, metal flakes, flake-form $SiO_2$, flake-form $Al_2O_3$ or flake-form iron oxide. The metal flakes can consist, inter alia, of aluminium, titanium, bronze, steel or silver, preferably aluminium and/or titanium. The metal flakes here may have been passivated by corresponding treatment. The glass flakes can consist of all glass types known to the person skilled in the art, for example of A glass, E glass, C glass, ECR glass, recycled glass, window glass, borosilicate glass, Duran® glass, labware glass or optical glass. The refractive index of the glass flakes is preferably 1.45-1.80, in particular 1.50-1.70. The glass substrates particularly preferably consist of C glass, ECR glass or borosilicate glass. Flake-form effect pigments having substrates comprising synthetic (for example fluorophlogopite) or natural mica, doped or undoped glass flakes and flake-form $SiO_2$ are preferably used in the pigment granules according to the invention. Particular preference is given to effect pigments having substrates comprising synthetic (for example fluorophlogopite) or natural mica.

The substrate of the effect pigment can preferably be coated with one or more transparent, semi-transparent and/or opaque layers comprising metal oxides, metal oxide hydrates, metal suboxides, metals, metal fluorides, metal nitrides, metal oxynitrides or mixtures of these materials. The metal oxide, metal oxide hydrate, metal suboxide, metal, metal fluoride, metal nitride, metal oxynitride layers or mixtures thereof can have a low refractive index (refractive index<1.8) or a high refractive index (refractive index≥1.8, preferably >2.0). Suitable metal oxides and metal oxide hydrates are all metal oxides or metal oxide hydrates known to the person skilled in the art, such as, for example, aluminium oxide, aluminium oxide hydrate, silicon oxide, silicon oxide hydrate, iron oxide, tin oxide, cerium oxide, zinc oxide, zirconium oxide, chromium oxide, titanium oxide, in particular titanium dioxide, titanium oxide hydrate, and mixtures thereof, such as, for example, ilmenite or pseudobrookite. Metal suboxides which can be employed are, for example, the titanium suboxides. Suitable metals are, for example, chromium, aluminium, nickel, silver, gold, titanium, copper or alloys, and a suitable metal fluoride is, for example, magnesium fluoride. Metal nitrides or metal oxynitrides which can be employed are, for example, the nitrides or oxynitrides of the metals titanium, zirconium and/or tantalum. Preference is given to the application of metal oxide, metal, metal fluoride and/or metal oxide hydrate layers and very particularly preferably metal oxide and/or metal oxide hydrate layers to the substrate. Furthermore, multilayered structures comprising high- and low-refractive-index metal oxide, metal oxide hydrate, metal or metal fluoride layers may also be present, where high- and low-refractive-index layers preferably alternate. Particular preference is given to layer packages comprising a high-refractive-index layer and a low-refractive-index layer, where one or more of these layer packages may be applied to the substrate. The sequence of the high- and low-refractive-index layers can be matched to the substrate here, in order to incorporate the substrate into the multilayered structure. In a further embodiment, the metal oxide, metal oxide hydrate, metal suboxide, metal, metal fluoride, metal nitride, metal oxynitride layers may be mixed or doped with colorants. Suitable colorants or other elements are, for example, organic or inorganic colored pigments, such as colored metal oxides, for example magnetite, chromium oxide, or colored pigments such as, for example, Berlin Blue, ultramarine, bismuth vanadate, Thenard's Blue, or alternatively organic colored pigments, such as, for example, indigo, azo pigments, phthalocyanines or also Carmine Red, or elements, such as, for example, yttrium or antimony. Effect pigments comprising these layers exhibit high color variety with respect to their mass tone and can in many cases exhibit an angle-dependent change in the color (color flop) due to interference.

The outer layer on the substrate is preferably a high-refractive-index metal oxide. This outer layer may additionally be on the above-mentioned layer packages or, in the case of high-refractive-index supports, part of a layer package and consist, for example, of $TiO_2$, titanium suboxides, $Fe_2O_3$, $Fe_3O_4$, $SnO_2$, $ZnO$, $ZrO_2$, $Ce_2O_3$, $CoO$, $Co_3O_4$, $V_2O_5$, $Cr_2O_3$ and/or mixtures thereof, such as, for example, ilmenite or pseudobrookite. $TiO_2$ is particularly preferred, furthermore $Fe_2O_3$, and mixtures of $TiO_2$ and $Fe_2O_3$. If the substrate flakes are coated with $TiO_2$, the $TiO_2$ is preferably in the rutile modification, furthermore in the anatase modification.

Particularly preferred effect pigments have the following structure:
substrate flake+$(SiO_2)$+$TiO_2$ (rutile)
substrate flake+$(SiO_2)$+$Fe_2O_3$
substrate flake+$(SiO_2)$+$Fe_3O_4$
substrate flake+$(SiO_2)$+$SiO_2$+$TiO_2$ (rutile)
substrate flake+$(SiO_2)$+$TiO_2$ (rutile)+$SiO_2$+$TiO_2$ (rutile)
substrate flake+$(SiO_2)$+$TiO_2$ (anatase)+$SiO_2$+$TiO_2$ (anatase)
substrate flake+$(SiO_2)$+$TiO_2/Fe_2O_3$+$SiO_2$+$TiO_2$+$TiO_2/Fe_2O_3$
substrate flake+$(SiO_2)$+$TiO_2/Fe_2O_3$+$SiO_2$+$TiO_2/Fe_2O_3$.

An $SiO_2$ layer can optionally be applied as protective layer to the substrate flake. If the substrate flake is a glass flake, the application of an $SiO_2$ layer is frequently advisable in order to protect the glass flake against leaching-out in the case of wet-chemical coating.

"High-refractive-index" is intended to be taken to mean a refractive index of ≥1.8, preferably >2.0, and "low-refractive-index" is intended to be taken to mean a refractive index of <1.8.

The thickness of the metal oxide, metal oxide hydrate, metal suboxide, metal, metal fluoride, metal nitride, metal oxynitride layers or a mixture thereof is usually 3 to 300 nm and, in the case of the metal oxide, metal oxide hydrate, metal suboxide, metal fluoride, metal nitride, metal oxynitride layers or a mixture thereof, preferably 20 to 200 nm. The thickness of the metal layers is preferably 4 to 50 nm.

The size of the substrates and thus of the effect pigments is not crucial. Flake-form substrates and/or flake-form substrates coated with one or more transparent or semi-transparent metal oxide, metal or metal fluoride layers generally have a thickness of between 0.05 and 5 µm, in particular between 0.1 and 4.5 µm. The length or width dimension is usually between 1 and 250 µm, preferably between 2 and 200 µm and in particular between 2 and 100 µm.

Very particularly preferred effect pigments have the following layer structure:
mica flake+$TiO_2$
mica flake+$TiO_2$+$Fe_2O_3$
mica flake+$TiO_2/Fe_2O_3$
mica flake+$Fe_2O_3$
mica flake+$Fe_3O_4$
mica flake+titanium oxynitrides
mica flake+$TiO_2$+$SiO_2$+$TiO_2$
mica flake+$TiO_2/Fe_2O_3$
mica flake+$TiO_2/Fe_2O_3$+$SiO_2$+$TiO_2$
mica flake+$TiO_2/Fe_2O_3$+$SiO_2$+$TiO_2/Fe_2O_3$
mica flake+$TiO_2/Fe_2O_3$+$SiO_2$+$TiO_2$+$TiO_2/Fe_2O_3$
mica flake+$TiO_2$+$SiO_2$+$TiO_2/Fe_2O_3$
mica flake+$TiFe_2O_5$
$Al_2O_3$ flake+$TiO_2$
$Al_2O_3$ flake+$Fe_2O_3$
$Al_2O_3$ flake+titanium oxynitrides
$SiO_2$ flake+$TiO_2$
$SiO_2$ flake+$Fe_2O_3$
$SiO_2$ flake+titanium oxynitrides
glass flake+$TiO_2$
glass flake+$Fe_2O_3$
glass flake+$TiO_2$+$Fe_2O_3$
glass flake+$SiO_2$+$TiO_2$
glass flake+$SiO_2$+$Fe_2O_3$
glass flake+$SiO_2$+$TiO_2$+$Fe_2O_3$
glass flake+$SiO_2$+$TiO_2$+$SiO_2$
glass flake+$TiO_2$+$SiO_2$+$TiO_2$
glass flake+$TiO_2/Fe_2O_3$
glass flake+$TiO_2/Fe_2O_3$+$SiO_2$+$TiO_2$
glass flake+$TiO_2/Fe_2O_3$+$SiO_2$+$TiO_2/Fe_2O_3$
glass flake+$TiO_2/Fe_2O_3$+$SiO_2$+$TiO_2$+$TiO_2/Fe_2O_3$
glass flake+$TiO_2$+$SiO_2$+$TiO_2/Fe_2O_3$
glass flake+$TiFe_2O_5$
glass flake+$SiO_2$+$TiO_2/Fe_2O_3$
glass flake+$SiO_2$+$TiO_2/Fe_2O_3$+$SiO_2$+$TiO_2$
glass flake+$SiO_2$+$TiO_2/Fe_2O_3$+$SiO_2$+$TiO_2/Fe_2O_3$
glass flake+$SiO_2$+$TiO_2/Fe_2O_3$+$SiO_2$+$TiO_2$+$TiO_2/Fe_2O_3$
glass flake+$SiO_2$+$TiO_2$+$SiO_2$+$TiO_2/Fe_2O_3$
glass flake+$SiO_2$+$TiFe_2O_5$
$Fe_2O_3$ flake+$TiO_2$
$Fe_2O_3$ flake+$Fe_2O_3$
$Fe_2O_3$ flake+titanium oxynitrides
metal flake (optionally passivated)+$TiO_2$
metal flake (optionally passivated)+$Fe_2O_3$.

Particular preference is given here to effect pigments having the said layer structures and based on mica flakes, glass flakes and $SiO_2$ flakes, in particular based on mica flakes.

$TiO_2/Fe_2O_3$ means that $TiO_2$ and $Fe_2O_3$ are present in a layer as a mixture and/or mixed oxide in the form of pseudobrookite. The pseudobrookite or the $TiO_2/Fe_2O_3$ mixed layer may optionally also be doped with $Al_2O_3$.

Suitable effect pigments are commercially available, for example from BASF Corp., for example under the trade names Firemist®, Rightfit™, Magnapearl®, and from Merck KGaA under the trade names Iriodin®, Miraval®, Xirallic® and Colorstream®.

In order additionally to increase the light, water and weather stability of the pigments, it is frequently advisable, depending on the area of application, to subject the effect pigment to post-coating or post-treatment. Suitable post-coating or post-treatment methods are, for example, the methods described in German Patent 22 15 191, DE-A 31 51 354, DE-A 32 35 017 or DE-A 33 34 598. This post-coating further increases the chemical stability or simplifies handling of the pigment, in particular incorporation into various media. In order to improve the wettability, dispersibility and/or compatibility with the application media, functional coatings comprising $Al_2O_3$ or $ZrO_2$ or mixtures or mixed phases thereof can be applied to the pigment surface. Furthermore, organic or combined organic/inorganic post-coatings are possible, for example with silanes, as described, for example, in EP 0090259, EP 0 634 459, WO 99/57204, WO 96/32446, WO 99/57204, U.S. Pat. No. 5,759,255, U.S. Pat. No. 5,571, 851, WO 01/92425 or in J. J. Ponjeé, Philips Technical Review, Vol. 44, No. 3, 81 ff., and P. H. Harding, J. C. Berg, J. Adhesion Sci. Technol. Vol. 11, No. 4, pp. 471-493.

The proportion by weight of the flake-form effect pigments in the pigment granules can be between 40-90% by weight, in particular >50-90% by weight. The proportion by weight is preferably >50-75% by weight. In a preferred variant of the invention, the pigment granule comprises 60-80% by weight and particularly preferably 60-75% by weight of the flake-form effect pigments, based on the pigment granule. The optimum proportions within these ranges can easily be determined by the person skilled in the art and depend essentially on the particle size of the effect pigments employed, the form factor of the effect pigments and the type of pigment structure.

As further essential constituent besides the flake-form effect pigments, the pigment granules also comprise at least one support material. A suitable support material should have, in particular, high transparency. The support materials can be in the form of individual particles, which are preferably spherical.

Polymer and glass beads, in particular solid polymer beads, hollow polymer beads, solid glass beads and/or hollow glass beads, can therefore be employed as support material. Preference is given here to solid glass beads and particularly preferably to hollow glass beads.

Transparent supports, such as, for example, solid glass beads and hollow glass beads, with their light transparency support the optical properties, for example the pearlescence or metal luster, of the effect pigments applied to the surface.

It is also possible to use mixtures of the support materials, in particular of solid glass beads and hollow glass beads. All conceivable mixing ratios can be used here, with the support materials preferably being mixed in such a way that physical and chemical properties, such as adhesion in the application medium and resistance to chemicals, correlate with aesthetic effects and economic considerations. Mixtures of support materials of different particle size can also be used.

The support material can have particle sizes of 3-1000 µm, preferably 5-1000 µm. The support material preferably has particle sizes of 3-299 µm, very particularly preferably 4-250 µm, in particular 5-200 µm. Particular preference is given to particle sizes of 15-150 µm, in particular 15-100 µm. The particle size indicated here is taken to mean the average particle size D50. It can be determined by means of sieve analysis in accordance with DIN 66165 Part 2, Edition 1987-04, or, in particular for small particle sizes, by means of laser diffraction, as described in ISO 13320, Edition 2009/10.

Solid glass beads of this type are commercially available, for example from Sovitec GmbH. The particle sizes are determined here in accordance with DIN 66165 Part 2. Further hollow glass beads are available, for example, from "3M Deutschland GmbH" under the trade name "3M Glass Bubbles" or from "Omega Minerals Norderstedt" under the trade name "Sphericel".

The glass beads should be chemically resistant, depending on the area of application. Solid glass beads or hollow glass beads made from soda-lime glass with the principal constituents $SiO_2/CaO/Na_2O$, ECR glass, C glass, borosilicate glass or quartz can preferably be used.

Hollow glass beads from "3M Deutschland GmbH" can have the following characteristic values:
Oil absorption: 0.2-0.6 g of oil/$cm^3$ (determined in accordance with ASTM 0281-95).
Particle size: 9-120 µm (determined in accordance with DIN 66165-2).

It is also possible to use hollow glass beads or solid glass beads made from soda-lime glass with the principal constituents $SiO_2/CaO/Na_2O$, ECR glass, C glass, borosilicate glass or quartz which are coated or colored with an organic or inorganic pigment.

In principle, all organic or inorganic pigments can be used for coloring or coating hollow glass beads or solid glass beads.

Thus, for example, it is possible to use organic pigments, as described in "Industrielle Organische Pigmente" [Industrial Organic Pigments] by the authors Hunger/Herbst, published by VCH-Verlag 1995, on pages 633-640.

Furthermore, organic and inorganic pigments, as described in "Pigment+Füllstofftabellen" [Pigment+Filler Tables] by the author Lückert, published by Vincentz-Verlag 2002, 6th Edition, can be used. Black pigments are described here on pages 407-434, white pigments on pages 72-94, red pigments on pages 216-299 and blue pigments on pages 326-361.

The colored or coated hollow glass beads or solid glass beads can subsequently be coated on the surface with flake-form effect pigments. If at least semi-transparent, flake-form effect pigments are used here, interesting effects may arise.

It is also possible to use colored hollow glass beads from "Quadra Industries". These hollow glass beads used can have the following characteristic value:
Particle size: 15-65 µm (determined in accordance with DIN 66165-2). The glass beads from Quadra Industries are covered with organic and/or inorganic pigments.

It is likewise possible to use unstructured particles having the same particle-size distribution.

The proportion of support material, based on the pigment granule, can be 10-60% by weight, in particular 10-<50% by weight. The proportion of support material is preferably 25-<50% by weight, particularly preferably 20-40% by weight and very particularly preferably 25-40% by weight. Furthermore, in the case of a particle size of the support material of 15-299 µm, preferably 15-200 µm, in particular 15-150 µm, the ratio of effect pigment and support material can also be from 1:1 to 3:1.

The pigment granules additionally comprise at least one adhesion promoter, preferably selected from the group of the ethylene-acrylic acid emulsions (EAA), acrylate dispersions, polyurethane dispersions and acrylate-polyurethane copolymer dispersions.

Suitable adhesion promoters are preferably those which dry physically. The adhesion promoters used are particularly preferably aqueous emulsions, preferably EAA emulsions (ethylene-acrylic acid copolymers), which are commercially available, for example, from Michelman under the name "Michem Prime 4983 R", and emulsions and dispersions based on acrylated polypropylenes or low-chlorinated polypropylenes. Emulsions and dispersions of this type are commercially available, for example from Tramaco under the name "Trapylen 9310 W" or "Trapylen 6700 W".

The size of the EAA emulsion particles is preferably 20-300 nm. The EAA emulsions preferably used preferably consist of 65-85 parts of water and 15-35 parts of EAA.

The size of the acrylated polypropylene or low-chlorinated polypropylene emulsion particles or dispersion particles is preferably 50-5000 nm.

Suitable adhesion promoters are furthermore wax emulsions, which are commercially available, for example, from KEIM ADDITEC Surface GmbH. Suitable wax emulsions are, for example, LD-PE wax emulsions (LD-PE=low-density polyethylene), for example Ultralube V-06070480 from KEIM ADDITEC Surface GmbH. The wax emulsions preferably comprise emulsion particles having a size of 20-100 nm. The suitable wax emulsions preferably have a melting range of 50-160° C., in particular 90-140° C. and very particularly preferably 90-130° C.

Further suitable adhesion promoters which are based on aqueous dispersions are mentioned below, such as, for example, those
1) based on copolymers or based on terpolymers:
vinyl acetate (VAC)/(ethylene) [E]=VAC/E
vinyl acetate (VAC)/(ethylene) [E]/vinyl chloride (VC)= VAC/E/VC
vinyl chloride (VC)/ethylene [E]/acrylate (AY)=VC/E/AY
vinyl chloride (VC)/ethylene [E]/vinyl laurate (VL)=VC/E/VL
vinyl acetate (VAC)/(ethylene) [E]/vinyl chloride (VC)= VAC/E/VC
2) based on acrylate dispersions:
styrene-acrylate (S-AY)
acrylate (AY)
self-crosslinking acrylate
polyacrylates and copolymers thereof
PMMA and copolymers thereof
3) dispersions based on the composition:
Versatic acid vinyl ester (VeoVa)/acrylate (AY)=VeoVa/AY
ethylene copolymer/acrylate=e-copol./AY
aqueous polyvinylbutyral dispersions=PVB
aqueous polyvinyl propionate dispersions=PVP
water-dilutable urea resins
water-dilutable polyesters
water-dilutable alkyd resins
water-dilutable colophony resins and colophony resin esters
water-dilutable shellac
water-dilutable polyvinyl acetals
water-dilutable polyvinyl ethers
water-dilutable soya proteins
polyvinyl alcohols=PVOH
4) polyurethane dispersions
4a) aliphatic polyurethanes
polyether (PE)/polyurethane (PU)=PE/PU
polyester (PES)/polyurethane (PU)=PES/PU
polycarbonate (PC)/polyurethane (PU)=PC/PU
polyester (PES)/polycarbonate (PC)/polyurethane (PU)= PES/PC/PU
4b) aliphatic oil-based polyurethane hybrids
based on castor oil (CO)
based on castor oil and linseed oil (LO)

Suitable adhesion promoters are furthermore adhesives based on resins and polymers which can be diluted with organic solvents or are soluble therein. These adhesion promoters are usually not water-soluble or water-dilutable. Examples of suitable raw materials are given, for example, in Lackrohstofftabellen [Coating Raw Materials Tables], Vincentz-Verlag, 10th Edition, 2000 edition, pages 62-622.

Examples of possible adhesives which can be used as adhesion promoters are based on the following resins and polymers:
saturated polyesters
unsaturated polyesters
epoxides
polyacrylates and copolymers
PMMA and PMMA copolymers
polyamides
ketone resins and aldehyde resins
polystyrenes
polyurethanes (PU)
polyurethanes (PU)/acrylates (AY)=(PU/AY)
moisture-curable polyurethanes
PVC
polyvinyl acetates
polyvinyl acetals
polyvinyl ethers
alkyd/melamine
urea resins
polyvinylbutyral=PVB
polyvinyl propionate=PVP
urea resins
polyester resins
alkyd resins
colophony resins and colophony resin esters
shellac The adhesives which can be employed as adhesion promoters are divided in accordance with the solidification mechanism into:
1. polymerisation adhesives, such as, for example,
cyanoacrylate (CY-AY)
MMA adhesives (MMA=methyl methacrylate)
anaerobically curing adhesives
radiation-curing adhesives
2. polycondensation adhesives, such as, for example,
phenol-formaldehyde adhesives
silicone adhesives
silane-crosslinking polymer adhesives
polyimide adhesives
3. polyaddition adhesives, such as, for example,
epoxy resin adhesives
polyurethane adhesives
4. hot-melt adhesives, such as, for example,
moisture-reactive amorphous poly-alpha-olefin hot-melt adhesive=1C APAO.

The proportion of adhesion promoter in the pigment granules can be 1-10% by weight. The proportion is preferably 1-9% by weight, particularly preferably 1-8% by weight, very particularly preferably 1-7% by weight, based on the total weight of the respective pigment granule.

Pigment granules may additionally comprise at least one additive, as are usual for use in application media from the areas of paints, coatings, powder coatings, plastics. Additives and/or assistants of this type can be lubricants, release agents, stabilizers, antistatics, flameproofing agents, antioxidants, colorants, flexibilisers, plasticisers, such as, for example, diisononyl phthalate, blowing agents, antioxidants, UV absorbers, inorganic fillers and/or surfactants, organic polymer-compatible solvents and/or surfactants, phenol derivatives, mineral oils. An overview of the additives and assistants which can be employed is given in Saechtling, Kunststoff Taschenbuch [Plastics Pocketbook], 27th Edition, Carl Hanser Verlag, or is given by R. Wolf in "Plastics, Additives" in Ullmann's Encyclopaedia of Industrial Chemistry, Internet edition, 7th Edition, 2003.

The pigment granules particularly preferably comprise wetting agents, for example silicones, silanes and/or fluorosurfactants.

The proportion of additive in the pigment granule can be 0-5% by weight, preferably 0.1-5% by weight. The proportion is preferably 0.2-5% by weight, particularly preferably 0.2-4.5% by weight, very particularly preferably 0.3-4% by weight, based on the total weight of the pigment granule.

The term "granule" in this application is taken to mean all solid particle shapes which are conceivable to the person skilled in the art, such as, for example, pellets, briquettes, pearlets, sausages or the tabletted form. These are macroscopic agglomerations of pigment granule particles, i.e. they consist of individual pigment granule particles which are stable in themselves, adhere to one another and are redispersible if necessary. The particle sizes of the granules are preferably in the range from 0.025 to 150 mm, in particular 0.1 to 20 mm and very particularly preferably in the range from 0.05 to 6 mm.

The support material, adhesion promoter and flake-form effect pigment can be present in pigment granules in a weight ratio of 0.1:0.01:0.9 to 0.49:0.1:0.51. The weight ratio is preferably 0.20:0.1:0.70.

Furthermore, pigment granules may preferably comprise
>50-90% by weight of one or more effect pigments
10-<50% by weight of at least one support material having a particle size of 3-1000 μm, preferably 5-1000 μm,
1-10% by weight of adhesion promoter and optionally
0.1-5% by weight of additives,
based on the total formulation of the pigment granule, where the total proportion of all components in the pigment granule is 100% by weight.

The pigment granules preferably comprise>50-75% by weight of one or more effect pigments, 25-<50% by weight of at least one support material having a particle size of 3-1000 μm, preferably 5-1000 μm, 1-7% by weight of adhesion promoter and optionally 0.3-4% by weight of additives.

These preferred pigment preparations particularly preferably comprise glass beads, preferably hollow glass beads, as support material.

Particularly preferred pigment granules comprise>50-75% by weight of one or more effect pigments, 25-<50% by weight of at least one support material having a particle size of 4-250 μm, 1-7% by weight of adhesion promoter and optionally 0.3-4% by weight of additives. These pigment preparations particularly preferably comprise glass beads, preferably hollow glass beads, as support material.

Furthermore, pigment granules with a particle size of the support material of 15-299 μm, preferably 15-200 μm, in particular 15-150 μm, may comprise 40-90% by weight of one or more effect pigments, 10-60% by weight of at least one support material, 1-7% by weight of adhesion promoter and optionally 0.3-4% by weight of additives.

Preference is furthermore given to pigment granules which comprise>50-75% by weight of one or more effect pigments, 25-<50% by weight of at least one support material having a particle size of 15-150 μm, 1-7% by weight of adhesion promoter and optionally 0.3-4% by weight of additives. These pigment preparations particularly preferably comprise glass beads, preferably hollow glass beads, as support material.

The support material enables the desired properties of the pigment granules according to the invention, such as, for example, reduced dusting behavior and/or improved flowability, to be ensured. The support particles are advantageously at least partially or fully coated or covered with the effect pigment and stuck to one another to form readily flowable granule.

Pigment granules may also comprise at least one filler, at least one dye and/or at least one colored pigment, in particular those which are usual in the plastics and/or surface coatings sector. Based on the pigment granule, where the total proportion of all components is 100% by weight, the proportion of dye, colored pigment and/or filler can be 0-10% by weight, preferably 0.1-5% by weight.

Fillers are taken to mean, for example, the known natural and synthetic materials, such as carbonates, especially calcium carbonates, barium sulfates, silicates, talc, mica, kaolin, feldspar, aluminium silicate, silicon dioxide, aluminium hydroxide and further inorganic and organic fillers. Fillers of this type are described in "Pigment+Füllstofftabellen" [Pigment+Filler Tables] by the author Lückert, published by Vincentz-Verlag 2002, 6th Edition, pages 596-768, and in Detlef Gysau, "Füllstoffe" [Fillers], Vincentz Verlag 2005.

The present invention furthermore relates to a process for the preparation of the pigment granules according to the invention in which at least one flake-form effect pigment and at least one support material are mixed simultaneously or successively with at least one adhesion promoter and optionally at least one additive.

Pigment granules can be prepared relatively easily. Possible preparation processes which may be mentioned are gentle mixing of the individual components—effect pigment(s), support material, adhesion promoter—and subsequent rotogranulation. In this case, the components to be mixed are mixed using a mixer, in which the support material, the adhesion promoter and optionally additives and the effect pigment or the mixture of effect pigments and optionally further organic and/or inorganic pigments are mixed. In the next step, the granules are rounded to the intended particle size on a horizontally rotating pelletising pan. Finally, the crude granules are dried gently in a turbulent bed, for example in a fluidised-bed or turbulent-bed drier. However, performance in a turbulent-bed drier is preferred.

The sequence of addition of effect pigment, adhesion promoter and support material is variable and can also be carried out, for example, in such a way that the effect pigment is initially introduced and subsequently mixed with the adhesion promoter, the support material and optionally additives. This procedure is particularly preferred.

It is likewise possible to initially introduce the effect pigment, the support material and optionally additives and subsequently to add the adhesion promoter.

The effect pigments, the support material and the adhesion promoter and optionally additives are in the form of a mixture with one another in the pigment granules according to the invention. The support material is preferably at least partially or fully coated or covered with the effect pigment by means of the adhesion promoter. Complete covering with and "sticking" of the support material to the flake-form effect pigment is very particularly preferred.

The present invention also relates to the use of the pigment granules according to the invention, individually or in mixtures, in application media such as printing inks, automobile OEM paints, automobile refinish paint systems, industrial coating systems, coil-coating materials, powder coatings, wood paints, plastic paints, emulsion paints, flooring coatings, greenhouse coatings, leather coatings, artists' paints, cosmetic applications, textile applications, plastics and effect plaster systems in the construction sector and as scatter and effect granules, for example for wallcoverings, and to the use in hydraulically hardening effect plaster systems.

The pigment granules according to the invention can advantageously be used, individually or in mixtures, for the production of coatings which exhibit strong glittering. At the same time, coatings of this type can have a matt and/or velvet-like appearance.

It is a particular advantage of the present invention that the pigment granules according to the invention cause a strong angle-independent glitter behavior of the coatings. They do not exhibit an "on/off effect" from different viewing angles, but instead angle-independent glittering is generated by de-alignment of the flake-form effect pigments. The term "on/off effect" is used in the case of pigment particles if the reflection capacity of these particles changes when the viewing angle is changed.

The de-alignment of the flake-form effect pigments and thus of the angle-independent glitter effect is characterized colorimetrically in accordance with the invention via the Alman flop index (D. H. Alman, Proc. of the ISCC Williamsburg Conf. on Appearance 53 (1987)). Large values of the Alman index mean a large color flop from specular angles to flat angles, i.e. good alignment, and small values indicate de-alignment/angle-independent glittering. The Alman index is calculated in accordance with the following formula:

$$\text{Alman index} = \frac{2.69(L_{15}^* - L_{110}^*)^{1.11}}{(L_{45}^*)^{0.86}}$$

L* corresponds to the luminance measured at the various angles, with separations from the specular angle of 15°, 110° and 45° respectively. In particular, the production of coatings having an Alman index of <5 is preferably possible using the pigment granules according to the invention.

The preferred pigment granules mentioned above are particularly suitable for such coatings, in particular those which comprise 40-90% by weight, preferably >50-75% by weight, of one or more effect pigments, 10-60% by weight, preferably 25-<50% by weight, of at least one support material having a particle size of 15-150 µm, 1-7% by weight of adhesion promoter and optionally 0.3-4% by weight of additives. These pigment preparations particularly preferably comprise glass beads, preferably hollow glass beads, as support material.

The pigment granules according to the invention are particularly suitable as scatter granules, for example for PVC plastisols, in aqueous and solvent-containing PU adhesives (PU=polyurethane), and in aqueous and solvent-containing acrylate adhesives, where they can be bonded firmly, for example, to wallcoverings made from paper, nonwoven, PVC foam or textile.

For wallcovering application, it is possible to initially introduce an adhesive primer, onto which the effect granules are scattered. For uniform application, a metering device has proven advantageous. The effect granules are applied via a sieve selected in accordance with the desired particle diameters.

The partial or full-area application of the pigment granules according to the invention to PVC plastisols which are usual in the wallcoverings industry as primer, such as, for example, Folcosol K-RSD 5048 transparent or Folcosol S-RSD 2067/9 smooth foam (manufacturer: Folmann, Munich), produces decorative wallcoverings.

The invention furthermore relates to paints, in particular emulsion-based wall paints for inside and outside, comprising at least one pigment granule as described above. The wall paints essentially consist of water, binders, pigments, fillers and additives. Binders are silicate systems based on water-glass or aqueous plastic or polymer dispersions consisting of pure acrylates, styrene acrylates, vinyl acetate-ethylene copolymers, silicone resins, polyurethanes. Depending on the application, the formulations may be pigmented super-critically or sub-critically. The pigment granules can be used in combination with the conventional pigments and fillers, it being possible for the pigment granules to be dispersed in at the end of the preparation process. A detailed description of the applications and formulations of emulsion paints is given in R. Baumstark, "Dispersionen für Bautenfarben" [Emulsions for Building Paints], Vincentz Verlag 2001. In order to show off the particular effect of the pigment granules to particular advantage, the formulations can be modified by, in particular, reducing the content of titanium dioxide and optionally also the content of fillers or even omitting them entirely. The titanium dioxide pigment and/or filler content here can be reduced by 10 to 100% compared with the standard formulations. The latter corresponds to so-called glazes. The substrate can be provided with a suitable primer, which sets the adhesion and water-absorption capacity. The primer may be provided with pigments for coloristic reasons.

The following examples are intended to explain the invention in greater detail, but without limiting it.

EXAMPLE 1

De-Aligned Pigment Granule

For the preparation of the pigment granule according to the invention, homogeneous mixing must be ensured. The mixture is prepared with the aid of an Eirich R02VAC EX mixer.

400 g of Sphericell® 25 P45 (hollow glass beads having a particle size D50=40-60 µm, determined in accordance with DIN 66165 Part 2; Edition: 1987-04, from Omega Minerals, Norderstedt GmbH) and 600 g of Iriodin® 307 are initially introduced successively in the mixing container. The mixture is then mixed at a fluidiser speed of 590 rpm (peripheral speed about 4 m/s). 200 g of a mixture "Alberdingk AC 25381" (48% acrylate dispersion, from "AlberdingkBoley") in distilled water (ratio 1:1) are subsequently metered in over the course of 20 min. by means of a laboratory hose pump from "Ismatec" (model BVP). The mixer speed is maintained. The mixing container is then evacuated and heated to 70° C. A pulverulent granule forms. Atmospheric pressure (1013 mbar) is then established in the mixing container, and the mixture is cooled to 30° C.

The subsequent checking of the solids content is carried out as follows: 4.5 g of unground test substance are treated at 135° C. for 12 min in a moisture analyzer, model MA 30 from Sartorius. A residual moisture content of 0.45% can be determined.

The coarse content of the pigment granule prepared in this way is firstly separated off via a sieve having a mesh width of 400 µm. The target fraction is separated off by subsequent classification via a sieve having a mesh width of 60 µm. The granule obtained in this way is abrasion-resistant and dimensionally stable and have unusual purity of the pearl effect produced.

EXAMPLE 2

De-Aligned Pigment Granule

For the preparation of the pigment granule according to the invention, homogeneous mixing must be ensured. The mixture is prepared with the aid of an Eirich R02VAC EX mixer.

500 g of Sphericell® 60 P18 (hollow glass beads having a particle size D50=15-19 µm, determined in accordance with DIN 66165 Part 2; Edition: 1987-04, from Omega Minerals, Norderstedt GmbH) and 500 g of Iriodin® 325 are initially introduced successively in the mixing container. The mixture is then mixed at a fluidiser speed of 590 rpm (peripheral speed about 4 m/s). 200 g of a mixture "Alberdingk AC 25381" (48% acrylate dispersion, from "AlberdingkBoley") in distilled water (ratio 4:1) are subsequently metered in over the course of 20 min. by means of a laboratory hose pump from "Ismatec" (model BVP). The mixer speed is maintained. The mixing container is then evacuated and heated to 70° C. A pulverulent granule forms. Atmospheric pressure (1013 mbar) is then established in the mixing container, and the mixture is cooled to 30° C.

The subsequent checking of the solids content is carried out as follows: 4.5 g of unground test substance are treated at 135° C. for 12 min in a moisture analyzer, model MA 30 from Sartorius. A residual moisture content of 0.45% can be determined.

The coarse content of the pigment granule prepared in this way is firstly separated off via a sieve having a mesh width of 400 µm. The target fraction is separated off by subsequent classification via a sieve having a mesh width of 60 µm. The granule obtained in this way is abrasion-resistant and dimensionally stable and have unusual purity of the pearl effect produced.

EXAMPLE 3

De-Aligned Pigment Granule

For the preparation of the pigment granule according to the invention, homogeneous mixing must be ensured. The mixture is prepared with the aid of an Eirich R02VAC EX mixer.

300 g of Q-Cel® 5037 (hollow glass beads having a particle size D50=45 µm, determined in accordance with DIN 66165 Part 2; Edition: 1987-04, from Omega Minerals, Norderstedt GmbH) and 700 g of Iriodin® 153 are initially introduced successively in the mixing container. The mixture is then mixed at a fluidiser speed of 590 rpm (peripheral speed about 4 m/s). 250 g of a mixture "Alberdingk AC 25381" (48% acrylate dispersion, from "AlberdingkBoley") in distilled water (ratio 4:1) are subsequently metered in over the course of 20 min. by means of a laboratory hose pump from "Ismatec" (model BVP). The mixer speed is maintained. The mixing container is then evacuated and heated to 70° C. A pulverulent granule forms. Atmospheric pressure (1013 mbar) is then established in the mixing container, and the mixture is cooled to 30° C.

The subsequent checking of the solids content is carried out as follows: 4.5 g of unground test substance are treated at 135° C. for 12 min in a moisture analyzer, model MA 30 from Sartorius. A residual moisture content of 0.45% can be determined.

The coarse content of the pigment granule prepared in this way is firstly separated off via a sieve having a mesh width of 400 µm. The target fraction is separated off by subsequent classification via a sieve having a mesh width of 60 µm. The granule obtained in this way is abrasion-resistant and dimensionally stable and have unusual purity of the pearl effect produced.

EXAMPLE 4

Emulsion Paints Having a Coloristic Effect and Structured Surface

Paint Preparation:

500 g of Caparol Deco Lasur gloss from Caparol are initially introduced in a 1 l beaker and subsequently diluted with 75 g of distilled water with stirring using an IKA RW 16 basic laboratory stirrer at 400 rpm for 1 min. This represents the base.

For the primer, 2% of "Caparol Yellow Tint" (AVA full color and tint series for outdoors and indoors) is added to the base with stirring.

For reference paints 1A and 1B, 5% of Iriodin® Star Gold 307 is added to the base with stirring. For paints 2 and 3 according to the invention, 5% and 10% of the de-aligned pigment granule from Example 1 are added to the base with stirring.

Application:

During priming, the primer is applied uniformly to the substrate by means of a microfiber roller. After drying for 1 hour at 25° C., the second coating follows. The second coating with reference paints 1A and 1B and paints 2 and 3 according to the invention is carried out by means of a brush. The brush coating is in each case carried out in only one direction from top to bottom. For all reference paints and paints according to the invention, with the exception of reference paint 1A, a single paint application is carried out. In the case of reference paint 1A, the reference paint is applied twice. The substrate used for the paints is a repair nonwoven wallcovering from "Dresden Papier" and a "Tempera duplex wallcovering nonwoven", in each case uncoated. The application rate is 130 g/m².

Color Measurement:

The wallcovering samples are characterized colorimetrically with respect to the Alman flop index (D. H. Alman, Proc. of the ISCC Williamsburg Conf. on Appearance 53 (1987)). The Alman flop index, Alman index for short, serves as a measure of the de-alignment, with large values meaning a large color flop from specular angles to flat angles, i.e. good alignment. The Alman index is calculated in accordance with the following formula:

$$\text{Alman index} = \frac{2.69(L^*_{15} - L^*_{110})^{1.11}}{(L^*_{45})^{0.86}}$$

L* corresponds to the luminance measured at the various angles, with separations from the specular angle of 15°, 110° and 45° respectively. In order to carry out the color measurements, the "BYK-mac" spectrophotometer from "BYK-Gardner" is used. The pigment de-alignment on the coated wallcoverings is assessed from the Alman flop index and also from a visual assessment of the sparkle effect/glitter effect.

The following values are measured here:

| Sample | Star Gold 307 | Pigment granule from Example 1 | Alman index |
|---|---|---|---|
| 1A | 5% | | 7.40 |
| 1B | 5% | | 5.26 |
| 2 | | 5% | 2.60 |
| 3 | | 10% | 2.26 |

It is evident from the values that paints 2 and 3 have a significantly lower Alman index. The desired de-alignment of the pigment particles at the same pigment concentration (samples 1B and 2) has thus been achieved. This is also evident from a visual assessment of the samples in comparison: the pearlescence at the specular angle is reduced. In addition, a change in the surface nature results, accompanied by a visual and actual haptic effect on touching. In the visual assessment, the surface is distinguished by a matter (=reduced gloss) and velvet-like appearance. Under directed illumination, strong glittering surprisingly arises, in spite of the reduced gloss of the surface, which, likewise unexpectedly, also appears at flat illumination angles, in contrast to reference 1B, which is actually more glossy.

In the case of sample 1A, the reference paint is applied twice. Compared with 1B, an additional thin overcoat is again applied. This increases the Alman index, corresponding to increased alignment, which is also evident visually, with a greater gloss effect.

EXAMPLE 5

Use in Powder Coating Systems

10% by weight of pigment granule from Example 1 are added to a clear powder coating material consisting of:

| Component | Trade name | Manufacturer | Amount |
|---|---|---|---|
| Resin | Uralac ® 879 | DSM | 930 g |
| Curing agent | Primid ®XL 552 | EMS-Chemie | 50 g |
| Degassing additive | Benzoin | | 4 g |
| Flow additive | Byk 364P | Altana | 16 g |
| | | Sum | 1000 g | and mixed vigorously with one another. The pigment granule is incorporated into the clear powder coating material by means of a "GFI" overhead mixer. The mixture is homogenized by mixing for 20 minutes at a speed of 20 $\text{min}^{-1}$. The powder coating/pigment granule mixture is applied electrostatically to a metal sheet (60 kV) and baked at 200° C. (object temperature) for 12 min.
Result: de-alignment can also be achieved in this case.

EXAMPLE 6

Use in Offset Overprint Varnish

Unusual pearl effects can be achieved by addition of 20% by weight of the pigment granule from Example 1 to the water-borne offset overprint varnish 35298 from Weilburger Graphics GmbH. The pigmented varnish is applied by flexographic printing by means of a "Flexiproof" device from "Erichsen". The print material used here is "Algro Finess 2000" with a weight per unit area of 80 g/m² from "Sappi Fine Paper".

The invention claimed is:
1. Pigment granules comprising at least one support material which is coated with at least one flake-form effect pigment by means of at least one adhesion promoter, wherein:
  a) the support material comprises solid polymer beads, hollow polymer beads, solid glass beads or hollow glass beads which have a particle size D50 of 15 to 299 μm, and the proportion of flake-form effect pigment in the pigment granule is 40-90% by weight, or
  b) the support material comprises solid glass beads or hollow glass beads which have a particle size D50 of 3 to 1000 μm, and the proportion of flake-form effect pigment in the pigment granule is from more than 50% to 75% by weight; and
  c) the at least one adhesion promoter comprises 1 10% by weight of the granule and is selected from the group consisting of:
   ethylene-acrylic acid emulsions (EAA),
   acrylate dispersions,
   polyurethane dispersions and
   acrylate-polyurethane copolymer dispersions.
2. The pigment granules according to claim 1, wherein at least one flake-form effect pigment is selected from the group consisting of the pearlescent pigments, interference pigments, metal-effect pigments, multilayered pigments having transparent, semi-transparent and/or opaque layers, goniochromatic pigments, holographic pigments, coated or uncoated BiOCl flakes and LCP pigments.
3. The pigment granules according to claim 1, wherein the proportion of flake-form effect pigment in the pigment granule is >50-75% by weight.
4. The pigment granules according to claim 1, wherein the at least one support material is a solid glass bead or a hollow glass bead.
5. The pigment granules according to claim 1, wherein the at least one support material comprises solid glass beads or hollow glass beads which have a particle size D50 of 5-1000 μm.
6. The pigment granules according to claim 1, which comprise >50-75% by weight of one or more flake-form effect pigments, 25-<50% by weight of at least one support material and 1-7% by weight of adhesion promoter.
7. The pigment granules according to claim 1, which comprise >50-75% by weight of one or more flake-form effect pigments, 25-<50% by weight of at least one support material having a particle size D50 of 15-150 μm and 1-7% by weight of adhesion promoter.
8. The pigment granules according to claim 1, wherein the pigment granule additionally comprises 0.1-5% by weight of at least one additive selected from the group consisting of the lubricants, wetting agents and antioxidants, and/or at least one inorganic filler and/or at least one dye and/or at least one colored pigment.
9. The pigment granules according to claim 1, wherein the pigment granule comprises support material, adhesion promoter and flake-form effect pigment in the weight ratio of 0.1:0.01:0.9 to 0.49:0.1:0.51.
10. A process for the preparation of the pigment granules according to claim 1, comprising simultaneously or successively mixing at least one flake-form effect pigment and at least one support material with at least one adhesion promoter and optionally at least one additive.
11. A composition selected from the group consisting of printing inks, automobile OEM paints, automobile refinish paint systems, industrial coating systems, coil-coating materials, powder coatings, wood paints, plastic paints, flooring coatings, greenhouse coatings, leather coatings, artists' paints, cosmetic applications, textile applications, plastics, effect plaster systems in the construction sector and scatter and effect granules as application medium, comprising at least one pigment granule according to claim 1.
12. A method which comprises producing coatings having an angle-independent glitter effect, which includes the step of incorporating at least one pigment granule of claim 1 in said coatings.
13. The method according to claim 12, wherein the resulting coatings have an Alman index of <5.
14. A paint composition comprising at least one pigment granule according to claim 1.
15. The paint composition according to claim 14, which is an emulsion-based wall paint composition for indoor or outdoor use.

* * * * *